United States Patent [19]

Heron

[11] Patent Number: 4,583,352
[45] Date of Patent: Apr. 22, 1986

[54] APPARATUS AND METHODS FOR AUTOMATICALY HANDLING ASEPTIC FITMENTLESS POUCH

[75] Inventor: J. Richard Heron, Danville, Calif.

[73] Assignees: FranRica Mfg. Inc., Stockton, Calif.; Container Technologies, Inc., Barrington, Ill.

[21] Appl. No.: 514,148

[22] Filed: Jul. 14, 1983

[51] Int. Cl.⁴ .................. B65B 51/12; B65B 51/14
[52] U.S. Cl. ................................. 53/570; 53/373; 156/494; 156/583.3
[58] Field of Search ............... 53/570, 571, 473, 573, 53/386, 468, 459; 156/494, 583.3

[56] References Cited

U.S. PATENT DOCUMENTS

| | | |
|---|---|---|
| 3,182,432 | 5/1965 | Canfield . |
| 3,430,409 | 3/1969 | Manfredonia et al. ........... 53/386 X |
| 3,566,578 | 3/1971 | Thorne et al. ..................... 53/386 X |
| 3,594,981 | 7/1971 | Pitts ....................... 53/386 |
| 3,796,142 | 3/1974 | Kuckhermann . |
| 4,098,054 | 7/1978 | Cerioni . |
| 4,108,300 | 8/1978 | Hayase et al. . |
| 4,320,615 | 3/1982 | Gmur ............................... 53/386 X |

Primary Examiner—Horace M. Culver
Attorney, Agent, or Firm—Wood, Herron & Evans

[57] ABSTRACT

Apparatus and processes for handling, filling and sealing a pouch in an aseptic environment include a pouch carrier and upper pouch grippers for holding the pouch during sterilization, filling and sealing. Vacuum jaws in an aseptic chamber engage, stretch and open the pouch, and a cutter cuts off a removable pouch seal before the pouch is opened. Once opened, the pouch is filled, then closed, sealed and moved out of the chamber through the bath.

15 Claims, 21 Drawing Figures

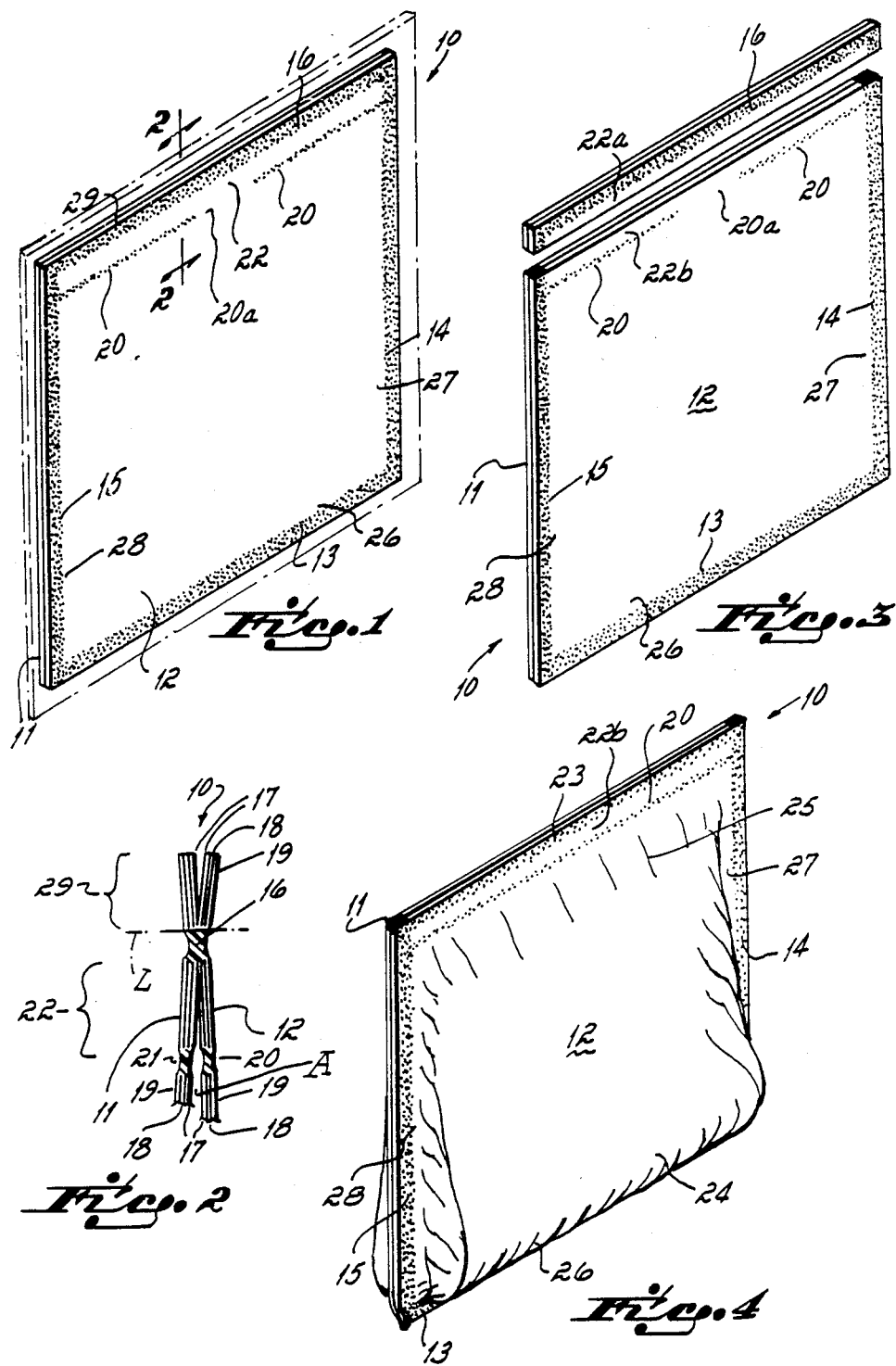

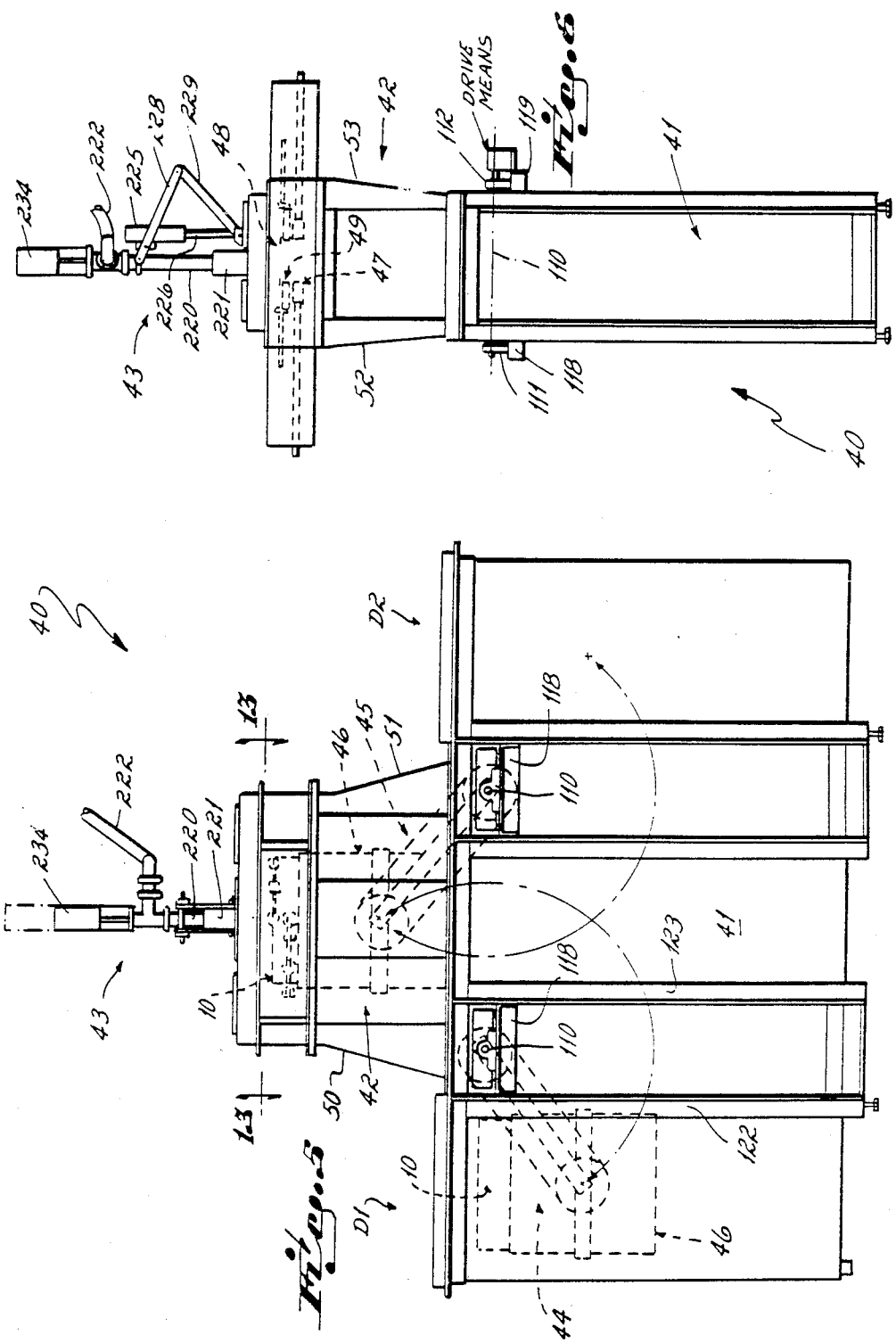

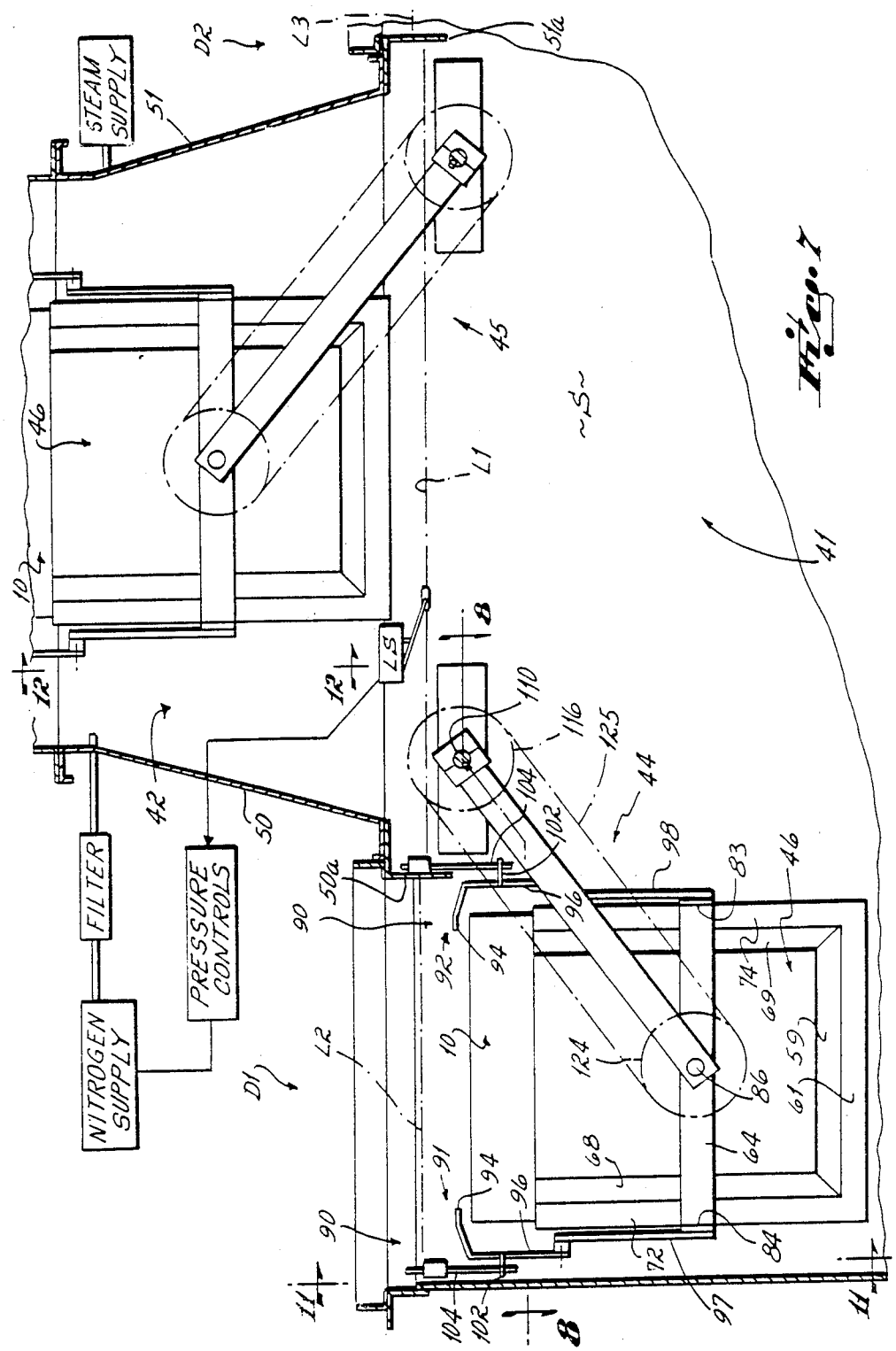

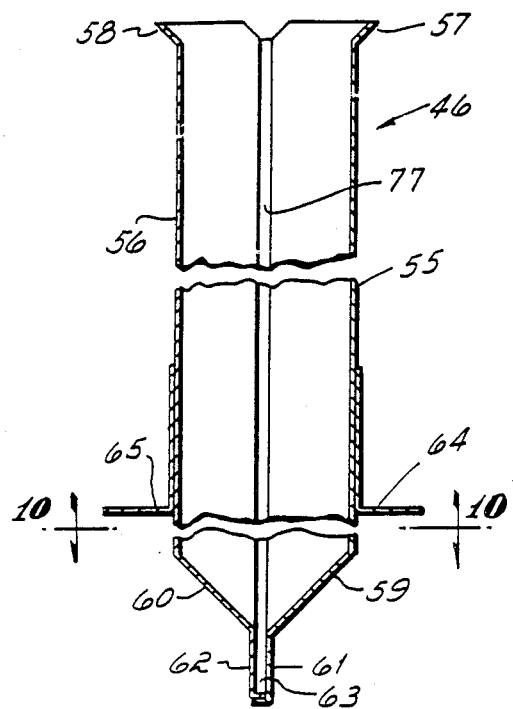
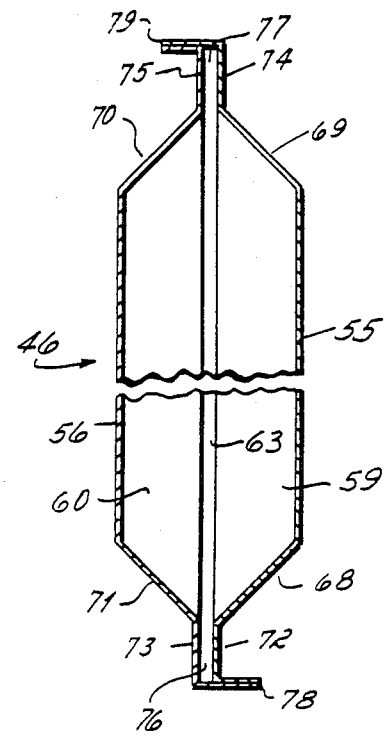
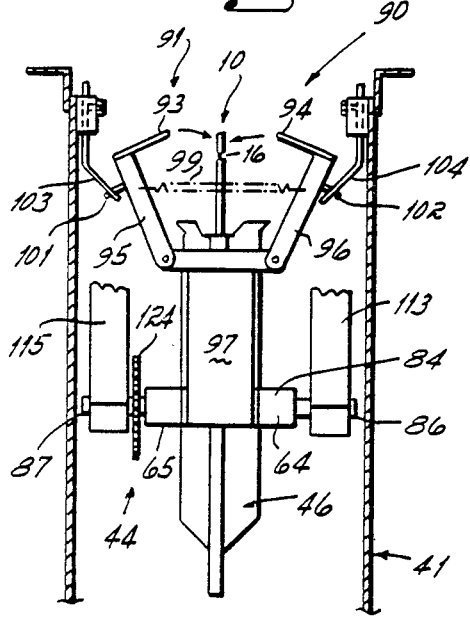
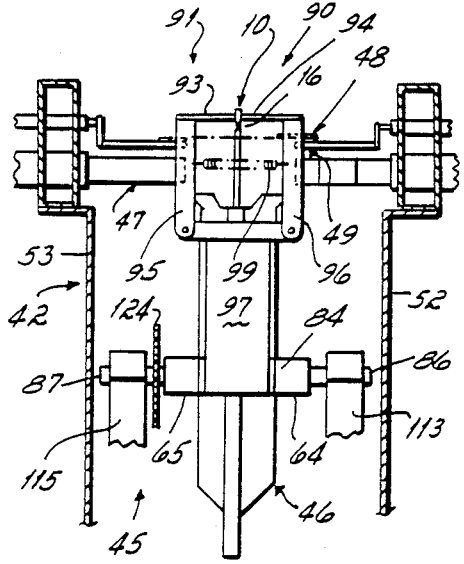

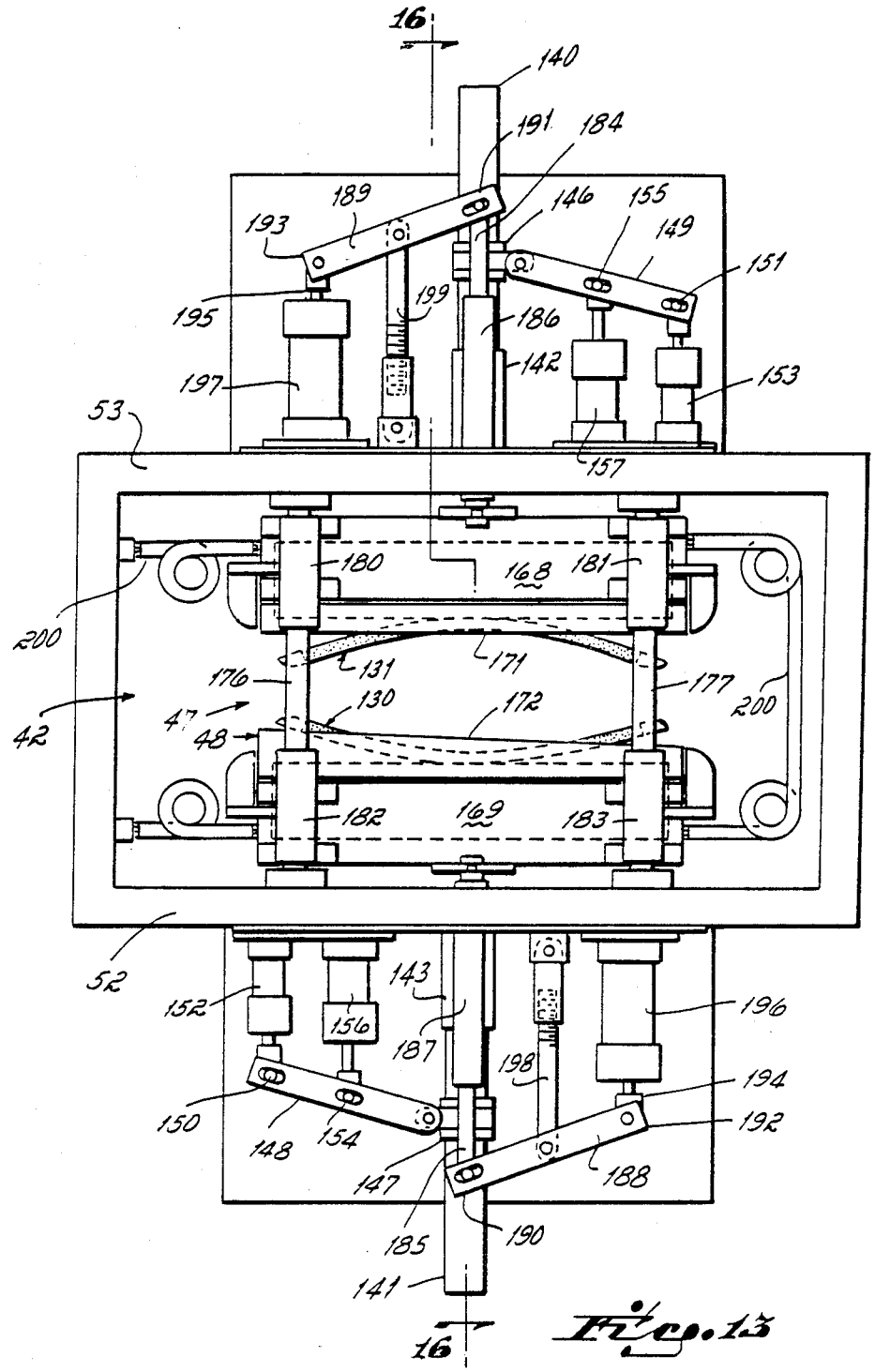

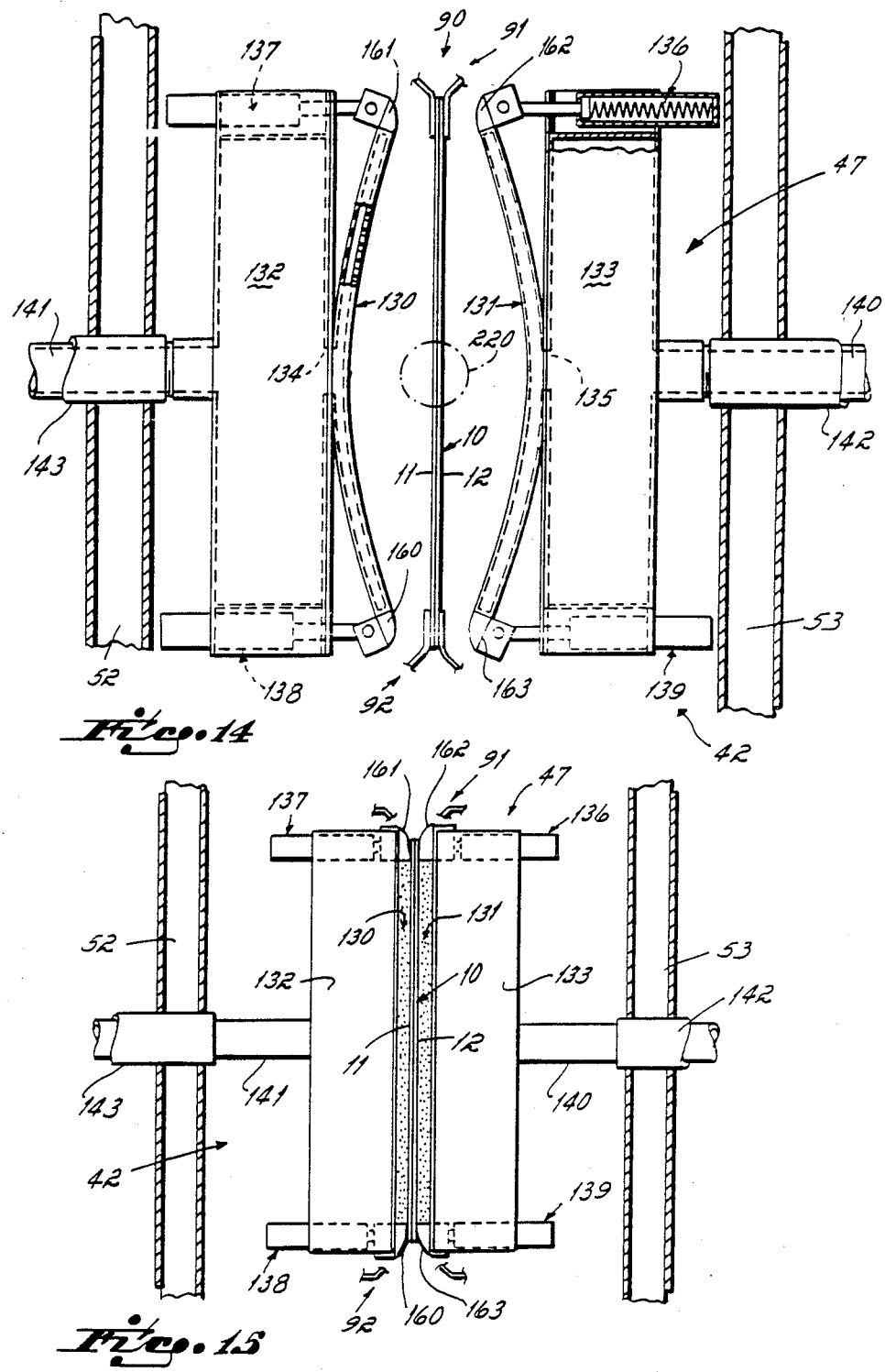

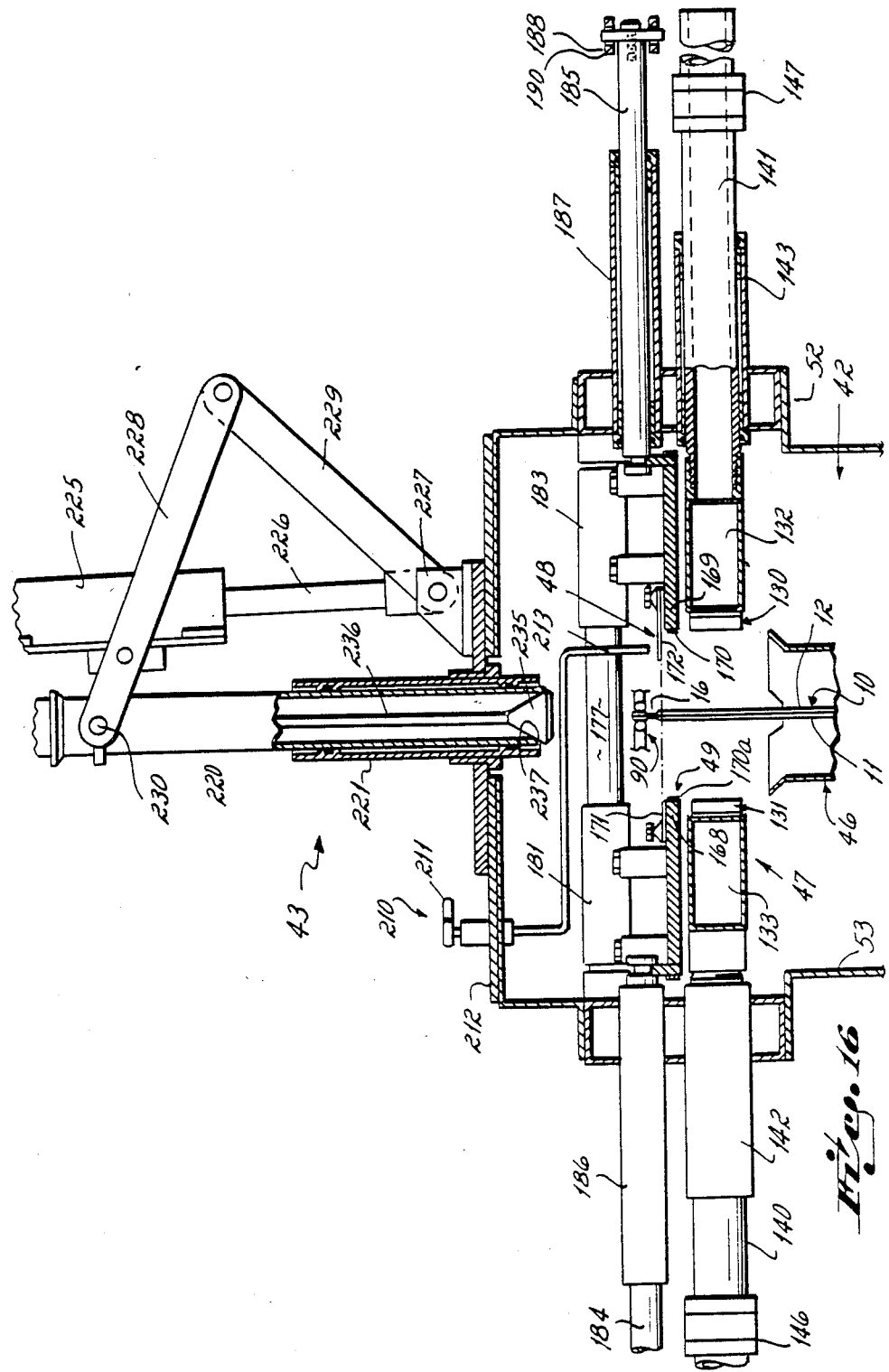

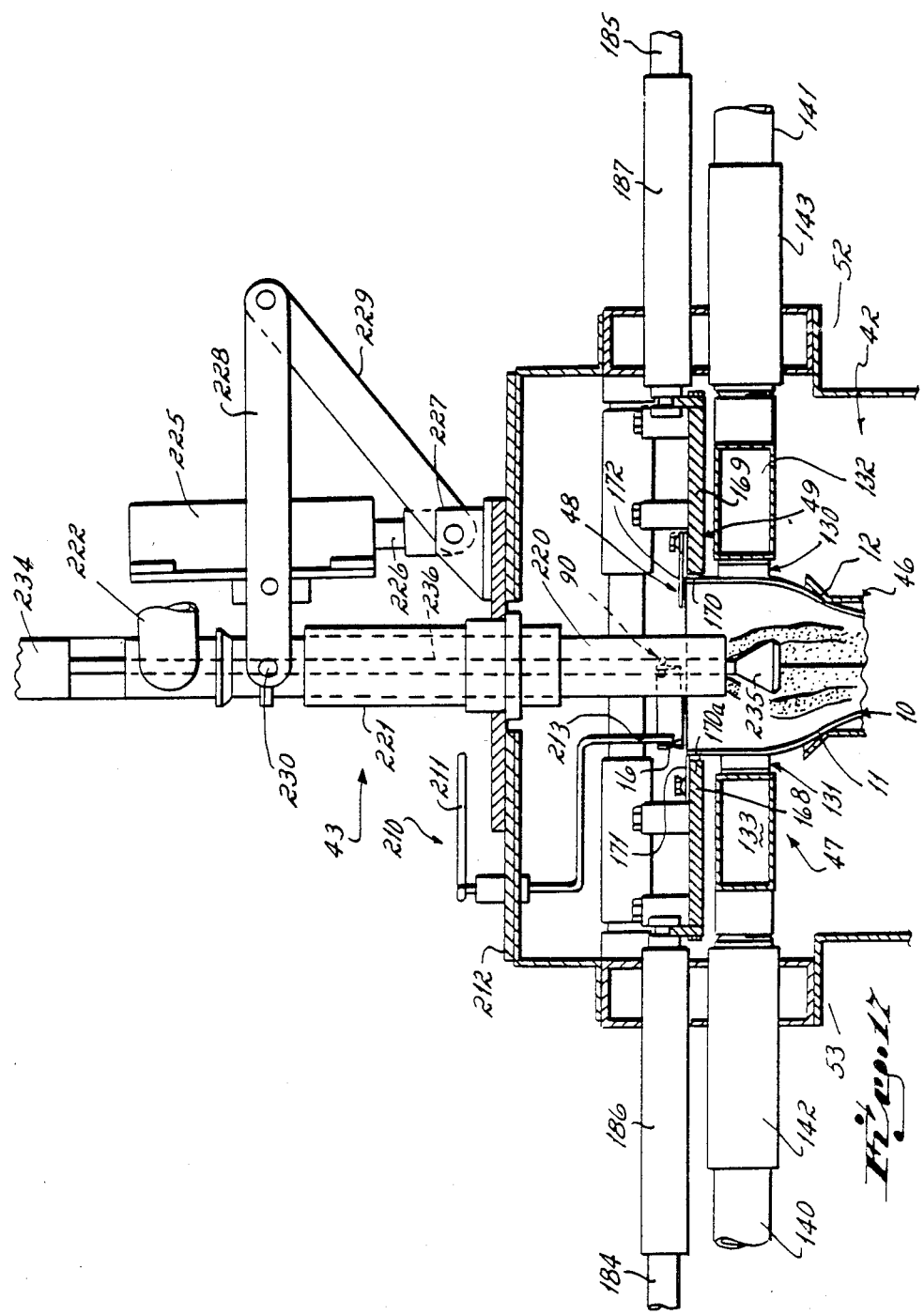

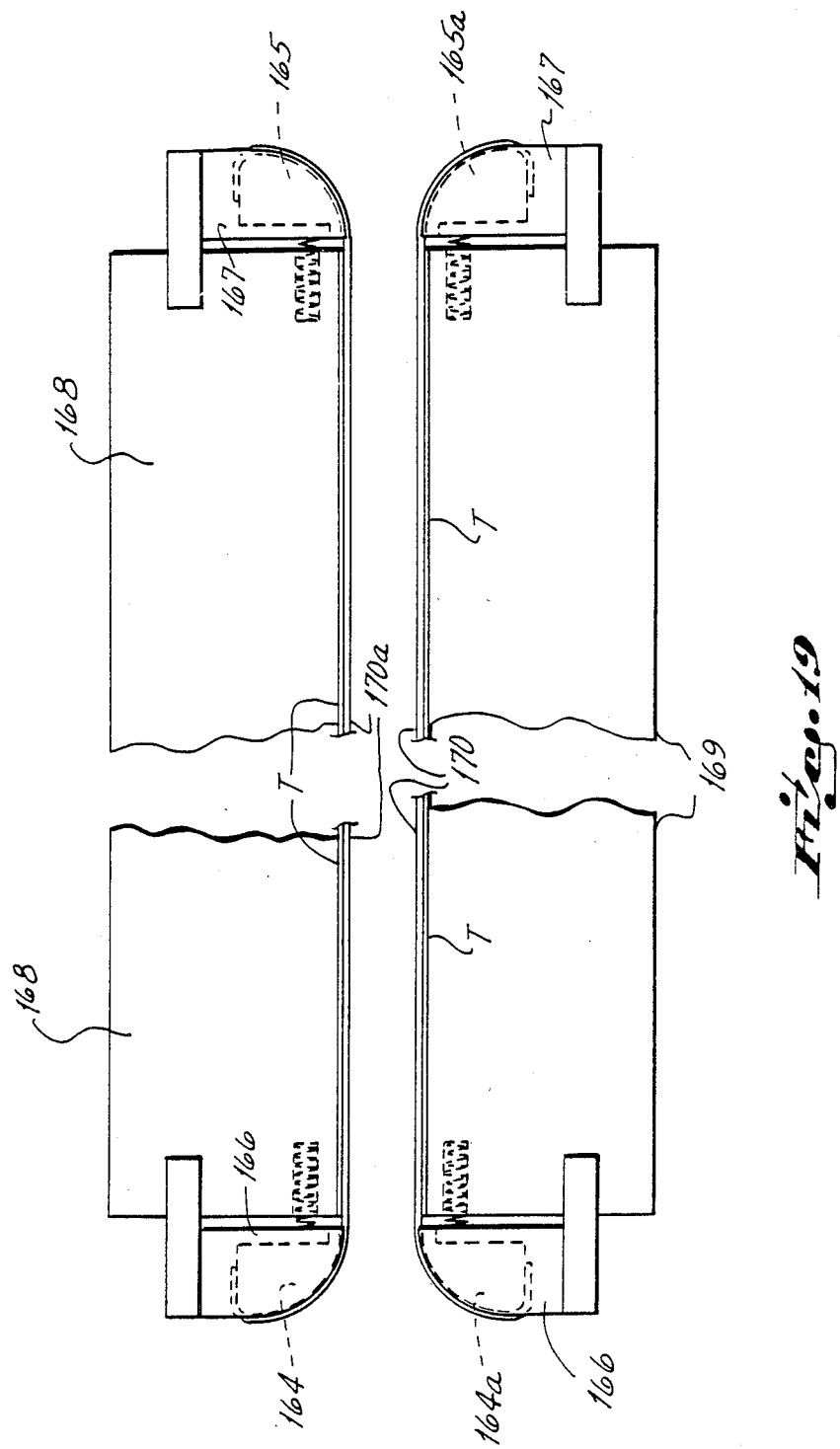

APPARATUS AND METHODS FOR AUTOMATICALY HANDLING ASEPTIC FITMENTLESS POUCH

This invention relates to aseptic packaging and more particularly to apparatus and methods for holding, opening, filling and sealing a flexible sidewall, aseptic, fitmentless pouch within an aseptic environment. This invention is also useful in hot filling processes.

This application claims subject matter disclosed, but not claimed, in related applications for patents filed on even date herewith.

Aseptic filling processes, such as utilized in the filling of flexible pouches with sterilized food products, for example, are attended by many problems. For example, the shelf life of an aseptic pouch is to a large extent dependent upon the oxygen barrier capability of the fitment provided on the pouch for the filling of the product therein. Barrier fitments have been proposed for shutting off oxygen penetration through the fitment area. Nevertheless, the fitment and the area surrounding the fitment acts as a "window" in the pouch. Oxygen may eventually penetrate this window, contaminating the pouch interior and its contents, thus destroying the aseptic condition of the pouch. By removing the fitment and thereby creating a fitment-free bag, the window could be eliminated together with the oxygen penetration through such a window. This would substantially increase the expected shelf life for the product in the pouch.

Moreover, in many cases the fitment is only used for filling the pouch, and is not necessary for dispensing product from the pouch. Use of the fitment thus adds significantly to pouch costs, even though only used in filling.

Moreover, prior art fitments were not generally tamperproof. That is, any tampering was not readily visible upon inspection of the pouch or the fitment.

Elimination of the fitment, however, produces other difficulties. For example, where foods are introduced into pouches under aseptic conditions, the pouch must thereafter be sealed before removal from the aseptic environment in order to retain an aseptic condition within the pouch. In many cases, it is difficult to keep food from lodging in the seal areas. Food products such as tomato seeds or other particulate products can lodge in the seal area and can cause subsequent leakage and potential contamination.

Moreover, food processors are not typically pouch producers or seal experts, and frequently lack complete knowledge about seal formation.

Thus, while it is desirable to utilize a fitmentless pouch for several reasons, the utilization of a fitmentless pouch which must be sealed after a product is introduced into the pouch is attended by these and other difficult problems.

For example, in the filling of a pouch under aseptic conditions, it is desirable to eliminate the manual handling of the pouch for obvious reasons. Particularly, mechanization of the operation is desirable to increase the output. Also, the necessity for manual handling of a pouch requires various access areas in which barriers to the ambient atmosphere must be provided in order to prevent contamination of the aseptic environment. Mechanization could eliminate the need for such manual access areas.

Accordingly, it has been one objective of the invention to provide improved means for automatically handling a flexible pouch throughout sterilization, filling and sealing in an aseptic chamber.

Another factor is the desire to utilize flexible pouches formed of sidewalls having multiple plies. Such pouches have outer plies for wear resistance, opacity and other characteristics, while it is necessary to provide internal plies which are suitable for containing a food product. When pouches are formed from sidewalls having multiple plies, the processor or packager must insure that the food is introduced into the pouch in the proper food-containing envelope and not between, for example, the plies of a respective sidewall. Accordingly, a product-receiving envelope must be defined between the innermost plies of the respective sidewalls prior to introducing the food product therein.

Accordingly, it has also been an objective of the invention to provide improved apparatus and methods for automatically opening a pre-sterilized, multiple-ply sidewall, sealed pouch in an aseptic environment, and for filling, closing and sealing the pouch within such environment.

In this connection it has also been an objective of the invention to provide filling and sealing apparatus, and methods, for opening flexible, multiple-ply sidewall pouches for filling by consistently defining a specific food-receiving envelope in each pouch, and thereafter closing and sealing each pouch.

The utilization of flexible, fitmentless pouches for aseptically receiving food products gives rise to a number of other problems, particularly where the pouches are to be mechanically or automatically handled, as opposed to being manually handled. The aseptic condition of the pouch must be secured and the pouch must be supported throughout the process, all within an aseptic environment. The pouch must be sealed and it must be removed from the aseptic environment without contaminating that environment. More particularly, and from a commercial standpoint, it is desirable to fill flexible pouches up to about 6 gallons. Where a fitmentless pouch is formed from sidewalls which are sealed together about their marginal edge portions, the weight of 6 gallons of product, or even less, is capable of exerting significant forces on the pouch from the inside. Such forces, particularly when filling the pouch in a vertical disposition, exert peel pressure against the side and bottom seals of a filled pouch, tending to cause the walls to peel apart at the seals.

Also, when a pouch is filled, the weight of the product in the pouch tends to distort the pouch at its filling mouth area. This distortion results in uneven, puckered, or otherwise incomplete or undesirable final seals.

Accordingly, it has been a further objective of this invention to provide a pouch gripping, support and carrier apparatus for holding and supporting a pouch throughout a sterilization, filling and sealing process wherein the final pouch seal areas are held against pressures tending to peel, wrinkle or disrupt the seal integrity, and wherein other marginal seals and adjacent pouch areas are supported to reduce seal peeling.

It is a further objective of the invention to provide improved apparatus and methods for sealing a pouch under aseptic conditions without seal uneveness, puckers or incomplete areas.

Finally, it is desirable to aseptically package many varied food products which are not merely liquids or small particulates. Accordingly, it is desirable to aseptically package foods which are typically in large particulates such as cut up peaches, for example, which a normal sized fitment might not pass.

Accordingly, it has been a further objective of the invention to provide filling and sealing apparatus and methods for a fitmentless pouch to accommodate the quick filling of pouches with products comprising large particulates.

SUMMARY OF THE INVENTION

To these ends, a preferred embodiment of the invention is based upon the concept of utilizing pre-sterilized and temporarily sealed multiple ply flexible pouches. These are individually placed in a pouch carrier which dips the pouch into a steriIant bath and then raises it into an aseptic chamber from the bath. Here, the temporary pouch seal is cut off, the pouch is opened, and product is filled into the pouch. The pouch is then finally sealed, removed from the sterile filling chamber through the sterilant bath, which also provides a discharge seal for the chamber, and is thereafter removal from the carrier and is placed in corrugated boxes for storage or shipment. No manual handling is required from the time the pouch is loaded into the apparatus until the time it is discharged.

The preferred embodiment of the invention incorporates a number of important features and advantages.

First, the particular pouch to be handled must be considered. While the invention herein is useful with other types of pouches, in order to take advantage of the benefits of various packaging materials, the pouch preferred for use in this invention is comprised of two adjacent multiple-ply side walls which are sealed together about margins thereof, after which the interior of the pouch is sterilized, such as by gamma radiation. Accordingly, the pouches are preferably first sealed and are then sterilized.

In a preferred embodiment, each flexible side wall of the pouch is made up of three distinct plies, although any suitable number of plies could be used. All of the plies, which together constitute the respective side walls, are sealed together in the margins or perimeter of the pouch near the pouch edges. Thereafter, the marginal portions of the pouches are trimmed down to the edge seals to remove any ply "ears" or "flaps" which might harbor contaminants.

Additionally, half seals are provided in the respective pouch side walls interiorly of and near a removable portion of the perimeter seal mentioned above. The half seals in each side wall seal only the plies of that side wall together, i.e., the side walls are not sealed together at the half seals. The half seals thus define a pouch mouth for filling, once the temporary seal is removed, and insure that the plies of each side wall will not separate therefrom during pouch opening and filling. Preferably, these half seals are slightly spaced interiorly of the removable, temporary, perimeter seal. Also, the half seals themselves are preferably partly discontinuous, as will be described, to permit escape of trapped air from between the plies during filling of heated product.

Since the pouches are pre-sealed, according to the invention, they can be manufactured, sealed and sterilized at any pouch-making facility, and supplied to the filling and sealing facility for use in a filling and sealing apparatus according to the invention. It is not necessary to re-sterilize the pouch interior during the filling and sealing process.

In use, each pouch is transported through the sterilant bath into the aseptic chamber, where the top temporary seal is cut from the pouch to form a filling mouth. The pouch is gripped at the cut off area near the half seals to open the mouth for filling, and the half seals insure opening a complete side wall with control of all related plies. Once the pouch is filled, the mouth is closed and the pouch is sealed on or adjacent to the lines of half seal. Accordingly, the invention contemplates use of a sealed, pre-sterilized pouch having a temporary top perimeter seal as well as half seals in the multiple plies of each of the pouch's side walls near the temporary top seal.

A preferred embodiment of the invention includes a pouch carrier which transports the pouch to and from the aseptic chamber through a sterilant tank and supports the pouch during filling. Specifically, the carrier includes side walls which have side and bottom portions tapered toward each and terminating in longitudinal slots for receiving and supporting the sealed margin portions of the pouch along its bottom and side edges. The pouch is originally inserted into the carrier so that the edges of the pouch, including the seals, extend into the slots. When the pouch is later opened and filled, the filling process tends to expand the pouch side walls and to draw the sealed edges inwardly from the slots to the point of the seal. At this point, the bottom and side portions of the pouch side walls lie on the tapered portions of the pouch carrier and on the side walls thereof, and further motion of the sealed edge portions inwardly does not occur. In this manner, the pouch carrier substantially supports the pouch and significantly reduces any internal pouch pressures which would tend to peel apart the bottom and side seams of the pouch while it is in its filled condition.

In order to support the pouch during the seal removal operation, pouch grippers are provided on the pouch carrier. These grippers are pivoted for motion toward the pouch at the upper edge margin thereof, and serve to grip the top temporary seal of the pouch at its ends. These grippers hold the ends of the seal throughout the dipping operation and while the pouch is raised to its position within the aseptic chamber. Thereafter, cutter knives are operated to cut off the top temporary seal. This removed seal is still held by the grippers, and will be held by them during filling and sealing and until the pouch is returned to its discharge position. Preferably the grippers are automatically operated as the pouch carrier moves into its discharge position, so as to release the now cut off temporary seal.

In order to open the pouch for filling and to define a food-receiving envelope between the innermost plies of the respective side walls, curved, deformable or resilient vacuum jaws, are moved toward and away from each other to engage and grip the pouch mouth, and to cooperate with the half seals to open a defined pouch mouth for filling. These jaws have ends which are located more closely adjacent than central portions of the jaws. As the jaws are moved toward each other and against the pouch, the ends engage the pouch first and tend to slide or pivot outwardly, stretching the pouch in a longitudinal direction until the vacuum jaws fully engage the pouch. Thereafter, as previously discussed, the temporary top seal is cut from the pouch and the jaws are then retracted to open the bag mouth, the half seals insuring definition of the food-receiving center envelope between the side walls.

Particularly, the half seals, which are now located in the uppermost portion of the pouch, tend to maintain the multiple plies of each side wall together so that the pouch is opened with all of the plies in their proper position with respect to their associated side wall. If there were no half seals, the vacuum jaws would simply grip the outer ply of each side wall and pull them apart. The full opening of the pouch, with all multiple plies being also opened in the respective direction of the respective side walls, of which they are a part, would not be guaranteed.

Once the pouch is filled the jaws are again moved toward each other, the ends thereof stretching the pouch in a longitudinal direction so that the upper edges of the pouch are maintained in flat adjacent condition for sealing, which is accomplished, for example, by an impulse or any other suitable sealing technique.

The stretching and holding of the pouch mouth, together with the support offered by the carrier for the filled pouch, insures a uniform, consistent seal, undisturbed by forces of distortion exerted by the product in the pouch.

Accordingly, the invention contemplates apparatus and methods for carrying a fitmentless, pre-sterilized, flexible pouch into an aseptic chamber through a sterilant bath; holding the pouch during cutting off of the temporary pouch seal; opening the pouch for filling and thereafter closing the pouch for sealing in an automatic fashion, and without seal peeling or distortion.

The invention provides numerous advantages, as mentioned above, including the automatic handling of temporarily sealed, pre-sterilized, pouches having multiple-ply side walls; means for fully supporting the pouch, to inhibit and reduce the peeling of the pouch seals during filling and handling; the automatic, mechanized handling of the pouch throughout the sterilization, pouch opening, filling, closing, sealing and discharge operations; and the ability to aseptically and automatically package products of large size particulates which might otherwise not fit through the fitments of available fitment-type pouches. These and other advantages of the invention will become readily apparent from the following written description of a preferred embodiment of the invention and from the drawings in which:

FIG. 1 depicts a pre-sterilized, temporarily sealed pouch having multiple-ply side walls;

FIG. 2 is a cross sectional view of the temporary and half seal areas of the pouch taken along lines 2—2 of FIG. 1, before the loose flaps above the temporary seal are removed;

FIG. 3 illustrates the pouch of FIG. 1 with the temporary seal of the pouch removed therefrom;

FIG. 4 is a perspective view of a filled and finally sealed pouch;

FIG. 5 is an elevational view of the filling and sealing apparatus according to the invention;

FIG. 6 is an end view of the filling and sealing apparatus of FIG. 5;

FIG. 7 is an enlarged view of the filling and sealing apparatus of FIG. 5, showing more detail of the pouch carrier and swing arm apparatus;

FIG. 9 is a cross sectional view of the pouch carrier;

FIG. 10 is a cross sectional view of the pouch carrier, taken along lines 10—10 of FIG. 9;

FIG. 11 is a cross sectional view of the pouch carrier in a loading position, taken along lines 11—11 of FIG. 7;

FIG. 12 is a cross sectional view of the pouch carrier in filling and sealing position before the temporary seal has been cut, and is taken along lines 12—12 of FIG. 7;

FIG. 13 is a cross sectional top plan view of the filling chamber, showing the vacuum jaws and cutting bars, taken along lines 13—13 of FIG. 5;

FIG. 14 is a top view of vacuum jaw apparatus for engaging, opening and closing the pouch according to the invention;

FIG. 15 is a view similar to FIG. 14, showing the pouch opening and closing apparatus in closed condition on the pouch;

FIG. 16 is a cross sectional view of the filling and sealing chamber, showing the pouch in closed condition, and taken along lines 16—16 of FIG. 13;

FIG. 17 is a cross sectional view similar to FIG. 16, but showing the pouch in an opened condition and filling apparatus in a fill condition;

FIG. 19 is a plan view of the details of the sealing apparatus.

Figure 8:
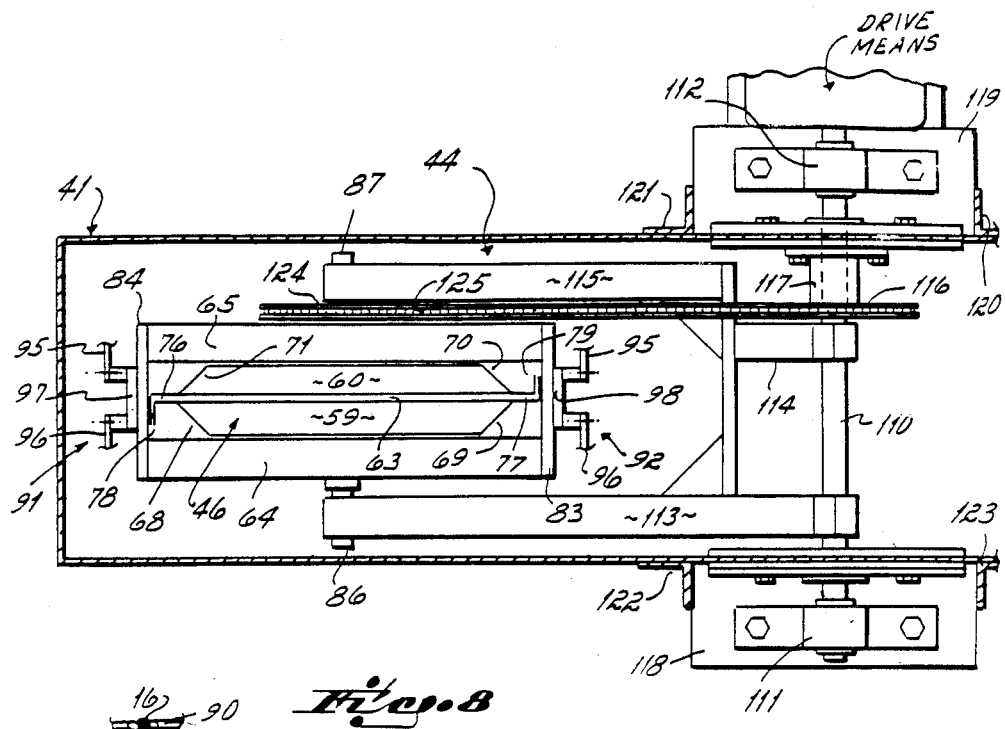
FIG. 8 is a top cross sectional view, taken along lines 8—8 of FIG. 7.

The details of the sealing apparatus are not shown in FIGS. 13–17 for reasons of clarity in those figures.

Turning to the drawings, a preferred embodiment of the invention will now be described. It will be appreciated that the following preferred embodiment is useful for the delivery of presterilized and temporarily sealed flexible pouches to an aseptic filling chamber, removal of a temporary end seal, opening of the pouch, filling of the pouch, closing and sealing of the pouch, and discharge of the pouch from the aseptic chamber, without contamination of the pouch interior and without contamination of the aseptic environment of the chamber.

More particularly, the invention is useful in filling pouches with a pre-sterilized food or other product in a cold fill aseptic process. Alternatively, the invention is useful to fill pouches with a food product which is subsequently sterilized by heating, as in a hot fill process.

FLEXIBLE POUCH

The flexible pouch and its details are perhaps best seen in FIGS. 1–4 of the drawings. FIG. 1 depicts a pre-sterilized, temporarily sealed, flexible pouch 10. Flexible pouch 10 may be of any suitable shape and size. As shown, however, in the preferred embodiment, the pouch is at least rectangular and comprises adjacent, multiple-ply, flexible side walls 11 and 12. The side walls are sealed together around the marginal edge portions of the pouch to define a product-receiving envelope. In particular, a bottom seal 13 joins bottom margin areas of the respective side walls together; vertical seals 14 and 15 join side margin areas of the side walls together; and a top seal 16 joins top margin areas of the side walls together to form a totally sealed pouch. Alternately, the pouch can include at least one folded over edge, the fold itself constituting a formed "seal".

FIG. 2 shows the details of the multiple-ply structure of the pouch. Each side wall 11 and 12 is comprised of a plurality of flexible plies. As shown in FIG. 2, each side wall is preferably comprised of three such plies. The innermost two plies, 17 and 18, of each side wall are preferably made from any suitable plastic film material, such as linear low-density polyethylene, for example, while the outer ply 19 of each side wall is preferably a barrier lamination including a layer made from a foil material or a suitable metallized substrate, or any other recognized flexible barrier or substrate materials including non-metallized materials. Preferably such an outer barrier lamination comprises an outer layer of Nylon, an intermediate layer of foil, and an inner layer of polyethylene. Alternatively, the barrier lamination could comprise an outer layer of polyethylene, an intermediate layer of metallized Nylon, or metallized polyester, or metallized polyvinyl alcohol, and an inner layer of polyethylene.

Other alternate intermediate layers having suitable barrier characteristics include unmetalized polyvinyl alcohol, unmetalized ethyl vinyl alcohol, and metalized ethyl vinyl alcohol.

In any event, all of the materials are selected such that they can be sealed together, giving due consideration to the product to be packaged. As also suggested in FIG. 2, the lines of seals 13–16 extend through the entire side walls, including all plies thereof, to form a secure pouch seal. Nevertheless, seal 16 defines a temporary or removable sealing means as will be described.

A half seal is located in each side wall below or interiorly of the top seal 16. Specifically, a half seal 20 is located in side wall 12 and a half seal 21 is located in side wall 11. As depicted in FIG. 2, each of these half seals joins only the plies of the respective side walls, i.e., the side walls are purposely not joined together at the half seals.

Also, each half seal 20 is discontinuous at its center, i.e., there is a centrally-located air passage or gap 20a in half seal 20 and a similar gap (not shown) in half seal 21. These respective seal gaps permit any air trapped between the respective plies of the associated side wall during formation of the bag to escape as the bag is filled with heated food product. Otherwise, such trapped air, when heated by the food product during filling, would tend to form undesirable air pockets, or pillows, between the sidewalls' respective plies. Moreover, it will be appreciated that the gaps themselves may be sealed, upon final sealing of the pouch, to prevent any movement of the filled product into the areas between the respective sidewall plies.

Since the half seals 20 and 21 are spaced in the pouch 10 interiorly of the full top seal 16, the half seals 20 and 21 are separated from the full top seal 16 by an unsealed portion 22 of the multiple-ply side walls extending therebetween.

The pre-sterilized pouches, such as shown in FIG. 1, can be manufactured by any suitable manufacturing techniques and stocked as a pre-sterilized pouch supply, whether singly or by lots. For example, webs defining the respective multiple plies can be positioned adjacent each other, sealed to form perimeter seals, and thereafter cut into individual pouches, the half seals described being provided in respective side walls before the perimeter seals are generated. Such pouches can be evacuated or otherwise treated or formed during formation, to remove air, and are provided in flat configuration. After manufacture and sealing, the internal areas "A" of the pouch (FIG. 2) are sterilized by any suitable means, such as by gamma radiation. Since the pouches are sealed at seals 13, 14, 15 and 16 the aseptic sterile condition in the interior of the pouch is maintained until the top seal is removed. Thus, the pouches are presterilized and are provided in temporarily sealed form for utilization in a filling and sealing apparatus according to the invention, as will be described.

For the purposes of this description of the preferred embodiment, it should also be noted that the pouch 10, as shown in FIG. 1, is constructed with the seals 13, 14, 15 and 16 slightly interior of the respective edges of the pouch in margins 26, 27, 28 and 29 as shown in FIG. 1. Of course, in the alternative, the pouch might be constructed with the seals 13, 14 and 15 extending out to the extreme edge of the side walls.

Nevertheless, when the pouch is made as shown in FIG. 2, the marginal areas 26–29 constitute flaps or ears which are external of the seals 13–16. It is recognized that these provide areas where bacteria and other contamination might reside. Even though the pouch is to be bathed in a sterilant during the filling process, complete sterilization of these areas might not be assured. If the bath did not completely sterilize these areas, the aseptic chamber, and consequently the pouch contents or interior, might be contaminated. Accordingly, it is desirable to trim marginal portions 26–29 down to the respective seals 13–16, either before or after the gamma radiation sterilization of the pouch, as illustrated particularly in FIG. 2 by phantom line L at margin 29.

In the filling and sealing apparatus, it is contemplated that the top seal 16 will be removed from the pouch 10 by cutting the pouch along the portion 22, between the full seal 16 and the half seals 20 and 21. After such cutting, a segment 22a (FIG. 3) of the portion 22 will remain with the top seal 16. The remaining segment 22b of the unsealed portion 22 is preferably left with the pouch, immediately above the half seals 20 and 21.

In this condition, after segment 22a with top seal 16 is removed, the two side walls 11 and 12 of the pouch can be drawn apart at their upper areas, proximate the half seals 20 and 21, to form a mouth or opening for filling. The half seals 20 and 21 cooperate with the respective plies of the side walls to assure that the filling mouth is formed at the top of the center envelope of the pouch which is defined between the innermost respective plies 17 of the side walls. Consequently, the half seals prevent separation of the plies within a pouch side wall at the filling mouth and assure product will be placed in the desired center envelope of the pouch and not inadvertently between the plies of any side wall. Thereafter, and as will be hereinafter described, the pouch is filled, closed and sealed, all within an aseptic chamber. Once the pouch is closed and sealed, it can be removed from the aseptic chamber.

In its filled and sealed condition, the pouch takes on the general appearance as depicted in FIG. 4, the pouch having been now fully sealed along final top seal 23 while still within the aseptic environment. In this regard, the top seal 23 is preferably either above or below the previous half seals 20 and 21, and not thereover. It is preferably slightly spaced therefrom. Where seal 23 is above the half seal, the gap 20a is also sealed to close off the area between the plies from the pouch contents by any suitable sealing means such as an extension of the sealing member hereinafter described.

As shown in FIG. 4, when unsupported in a vertical condition, the pouch tends to bulge out at the bottom area 24 to a greater extent than at the top area 25. The forces exerted by the product within the pouch on the side walls 11 and 12 are exerted in a direction which tend to peel apart the seals therebetween, and particularly the seals 13, 14 and 15 when the pouch is in such a vertical position.

The present invention provides means for supporting the pouch 10 at the bottom and along the side seal areas during the handling and filling of the pouch within the filling and sealing apparatus in order to significantly resist any forces tending to peel the seams apart. This will be hereinafter described with respect to the pouch carrier.

FILLING AND SEALING APPARATUS—GENERAL CONSTRUCTION

The general construction of the entire filling and sealing apparatus is perhaps best seen in FIGS. 5, 6 and 7. In FIG. 5, the filling and sealing apparatus 40 includes a sterilant tank 41 and an aseptic chamber 42, providing an aseptic environment for the filling of pouches. A filling means 43 is disposed on an upper portion of the chamber 42 for the purpose of introducing an aseptic product into the chamber, and a pouch therein.

The filling and sealing apparatus 40 is provided with at least one swing arm apparatus 44, for moving pouches between a first position, outside the chamber 42, to a second position in the chamber 42 for opening, filling and sealing of the pouches, and then for returning pouches to the first position for discharge. A second swing arm apparatus 45, like that of swing arm 44, is mounted on the other side of chamber 42. This arm 45 operates in an identical manner to apparatus 44, but moves pouches from the filling position to a discharge position on the opposite side of the chamber from the first discharge position serviced by arm 44. Each swing arm apparatus includes a pouch carrier 46, the details of which are best seen in FIGS. 8-12.

Also located within the aseptic chamber 42 are vacuum jaw means 47 (FIGS. 14 and 15) for engaging, stretching, opening and closing the pouch within the chamber. Cutter means 48 (FIG. 13) are disposed within the aseptic chamber 42 for cutting off the temporary top seal 16 of the pouch 10. Also, sealing means 49 are also provided in chamber 42 for sealing the pouches after they are filled.

Further describing the operational orientation of the apparatus, chamber 42 has side walls 50 and 51. Flanges 50a and 51a extend downwardly from the side walls 50 and 51 into the sterilant tank 41. Front and rear walls 52 and 53 of the chamber 42 are sealed to the walls of tank 41.

In operation, sterilant tank 41 is filled with a chemical sterilant, S, such as a mixture of water and an iodophor solution. A suitable sterilant is disclosed, for example, in U.S. Pat. No. 3,678,955, issued July 25, 1972. The sterilant has a surface at level L-1 defining a floor of chamber 42. Flanges 50a and 51a extend into the sterilant surface, effectively sealing the chamber 42. Sterilant S thus forms a sterile, hydrostatic seal and trap for chamber 42.

It should also be noted that the chamber 42 is situated centrally of tank 41, as seen in FIG. 5. Tank 41 provides pouch discharge or carrier loading openings D-1 and D-2 on opposite sides of the chamber 42. At each of these openings, the sterilant S of tank 41 defines a surface at level L-2 (discharge opening D-1) and at level L-3 (discharge opening D-2). To maintain carrier sterility, they do not rise out of the bath at positions D-1 and D-2.

FILLING AND SEALING APPARATUS—CHAMBER PRESSURE CONTROL

The invention further contemplates means for controlling the pressure within the chamber 42. It is desired to maintain a positive predetermined pressure within the chamber 42 to insure that any leakage is outward and not inward.

In the preferred embodiment, an inert gas such as nitrogen is supplied under pressure to the chamber via a microbial nitrogen filter supply, and pressure control. Such a microbial filter can be of any known type suitable for use in maintaining the desired asepsis.

The pressure within the chamber is controlled, according to the invention, by sensing the level of sterilant in the chamber and controlling the pressure by increasing nitrogen flow when the level of sterilant rises, and decreasing nitrogen flow when the level drops.

To these ends, a level sensing switch, LS (FIG. 7), preferably comprising a proportional float switch of any suitable type, is located in chamber 42 (FIG. 7) and is provided with float means for sensing sterilant level. Electrical signals are transmitted to a pressure control regulator of any suitable type for controlling the pressure within the chamber.

It will be appreciated that any suitable level sensor and control can be used to accomplish this function as according to the invention.

FILLING AND SEALING APPARATUS—POUCH CARRIER

The pouch carrier 46 is best seen in FIGS. 8-12. It includes a first side wall 55 and a second side wall 56 (FIG. 9). Each of the side walls has a flared portion at its upper end as shown at 57 and 58, and bottom portions 59 and 60, which are tapered inwardly toward each other, terminating in parallel portions 61 and 62, defining a slot 63 therebetween. The side walls 55 and 56 are provided with brackets 64 and 65 for mounting the carrier on the swing arm apparatus 44 as will be described.

FIG. 10 depicts a cross sectional view of the carrier, showing the configuration of the carrier sides. Each of the side walls 55 and 56 has tapered portions 68, 69 and 70, 71, respectively. The opposed portions 68 and 71, taper inwardly toward each other and terminate in elongated parallel portions 72, 73, forming a slot 76. Tapered portions 69 and 70 taper inwardly toward each other and terminate in elongated parallel portions 74, 75 forming slot 77. The side walls and the tapered portions of the carrier depicted in FIGS. 9 and 10 provide support for the pouch as the pouch is filled, and as will be described.

In FIG. 10, the elongated portions 72, 73 and 74, 75 terminate in respective perpendicular ears 78 and 79 for the purpose of attaching the carrier to the swing arm, as will be described.

In order to mount the carrier on the swing arm, a frame comprising the angles 64 and 65, together with end plates 83 and 84 (see FIGS. 8 and 11), are provided in a position surrounding and supporting the carrier. The frame members or brackets 64 and 65 are connected intermediate their ends to stub shafts 86 and 87 for pivotal mounting of the carrier on the swing arm apparatus 44. Ears 78 and 79 are secured to respective end plates 84, 83 to rigidify the mounting of the carrier.

The carrier 46 is also provided with pouch gripping means 90 comprising two sets of pouch gripper jaws 91 and 92 (FIG. 7). The gripper jaws have an open position, as depicted in FIG. 11, and a closed position, as depicted in FIG. 12. In FIG. 11, the gripper jaws are open at discharge position D-1 so as to accommodate the insertion of a pouch 10 into the carrier 46. In FIG. 12, the gripper jaws are depicted in their closed position in chamber 42, where they engage an upper portion of the pouch 10 on or above the top seal 16 for holding the same while and after it is cut from the pouch 10.

Each set of gripper jaws includes a pouch engaging member 93 and 94 mounted on the respective arms 95 and 96 which are pivoted to upstanding plates 97 and 98. A spring 99 is provided for resiliently urging the arms and the pouch engaging members toward each other in order to engage and hold an upper portion of the pouch, near temporary top seal 16.

Moreover, the apparatus includes means for automatically opening and closing the pouch gripping means. In particular, each of the arms 95 and 96 is provided with a cam follower 101 and 102, respectively. Cams 103 and 104 are secured to the walls of the tank 41, as best shown in FIGS. 7 and 11.

As the pouch carrier 46 is moved toward its first position at discharge area D-1, for example, as depicted in FIG. 7, the pouch gripping means for the upper end of the pouch is generally in its closed pouch engaging position such as depicted in FIG. 12. As the carrier moves into its uppermost first position, however, the cam followers 101 and 102 engage the respective cams 103 and 104 such that continued upward movement of the pouch carrier 46 causes the arms 95 and 96 to swing away from each other. This releases the severed top seal 16 and segment 22a of any filled pouch in the carrier and opens to permit insertion of a new unfilled pouch, with integral top seal 16, within the carrier 46.

FIG. 12 depicts the pouch carrier 46 in a second position within the filling and sealing aseptic chamber 42, wherein the gripping means 90 is operable to retain the upper portion, including the removable seal 16 of the pouch 10. Thus, once the upper temporary seal 16 of the pouch has been cut off, such as shown diagrammatically in FIG. 3, the gripping jaws 91 and 92 continue to hold the removed temporary seal until finally removed therefrom. Preferably, the cut off portion is held by the gripping means until the entire pouch carrier 46 is removed from the aseptic chamber 42 and through the sterilant tank to the pouch discharge postion D-1, such as shown in FIG. 11, where both the cut off portion and the filled pouch can be removed from the carrier.

FILLING AND SEALING APPARATUS—SWING ARM

As previously stated, the filling and sealing apparatus preferably includes a first swing arm means 44 and a second swing arm means 45. Each are mounted on the tank or frame of the apparatus, as shown in FIGS. 5 and 7. With this mounting, one swing arm, such as swing arm 44, can be disposed in the first position for loading or discharging a pouch from the pouch carrier 46, while the other swing arm 45 has been rotated into a second position within chamber 42 for filling and sealing of the pouch therein. Swing arm 45 is moved to discharge position D-2 for removing a filled pouch and inserting a new pouch. Simultaneously, swing arm 44 is moved into the chamber 42 for filling a pouch. This construction has the result of doubling the output of the filling and sealing apparatus 40. The construction of the second swing arm means 45 is essentially similar to that of swing arm means 44, and thus only the elements of swing arm apparatus 44 will be discussed in detail.

It will be appreciated that both of the swing arm means 44 and 45 are mounted on shafts 110 which are journaled such as by bearings 111 and 112, for rotation with respect to the filling and sealing apparatus. These pivot points are preferably disposed at opposite sides of the chamber 42.

Each of the swing arm means includes an elongated arm 113 and a shorter arm 114 secured to the shaft 110. An arm 115 is connected to the short arm 114, and the arms 113 and 115 extend outwardly for connection to the respective stub shafts 86 and 87 (FIG. 8) for connection to the pouch carrier 46. It will be appreciated that the pouch carrier is mounted on the stub shafts 86 and 87 for pivotal motion with respect to the arms 113 and 115.

It will also be appreciated that each swing arm apparatus includes means for maintaining the pouch carrier in a vertical position, such as is shown in FIG. 7. To this end, a sprocket 116 is fixed to the wall of the tank 41, as shown in FIG. 8, through a sprocket hub 117. Preferably, the shaft 110 extends through the sprocket hub and through the tank wall on both sides of the tank to engage the bearings 111 and 112.

For the purpose of rigidity, these bearings are mounted on frame members, such as at 118 and 119, which are secured to further upright frame members 120 through 123. Consequently, the bearings 111 and 112, the sprocket hub 117, and the sprocket 116 are stationarily mounted.

A sprocket 124 is secured to the pouch carrier 46 at bracket 65 and is thus mounted for rotation with respect to the swing arm 115. A flexible drive member, such as a chain 125, is disposed over the sprockets 116 and 124. As the swing arm rotates with the shaft 110, sprocket 116 remains stationary and the stub shafts 86 and 87 rotate about the axle 110. The sprocket 124 is free to rotate with respect to the swing arm, and thus the interaction of the chain with the stationary sprocket 116 and the movable sprocket 124 positively maintains the bag carrier 46 in a vertical position throughout the latter's arcuate movement between the first and second positions.

Of course, it will be appreciated that the filling and sealing apparatus 40 is provided with one or more drive means for selectively rotating the shaft in response to an operational control signal. As will be apparent to those skilled in the art, the drive means (FIG. 8) may constitute electric, pneumatic or hydraulic motors or any suitable driven drive train for rotating the shafts 110 and the swing arm means. These are controlled by any suitable means to insure the desired dwell time of pouches in the sterilant bath before they are introduced into the aseptic chamber 42.

FILLING AND SEALING APPARATUS—VACUUM JAWS

Turning now to FIGS. 13–17 of the drawings, the aseptic chamber 42 is provided with means for engaging the pouch, cutting off the temporary removable top seal 16, opening the pouch, filling the pouch, stretching and closing the pouch, and thereafter sealing the pouch.

A vacuum jaw means 47, as shown in FIGS. 14 and 15, is provided for engaging, stretching, opening and closing the pouch. A cutter means 48 (FIG. 13) is disposed over the vacuum jaw means 47 for cutting off the temporary top seal 16 of the pouch.

Turning to FIGS. 14 and 15, the vacuum jaw means 47 includes two curved, resilient, preferably porous elongated jaw elements 130 and 131. Each of these elements lies in a normally curved configuration opposite each other, such as depicted in FIG. 14. Moreover, each of the elements are mounted to a respective vacuum manifold 132 and 133, at central areas of said elements, communicating through respective passageways 134 and 135 for the introduction of vacuum to the porous elements.

The porous jaw elements 130, 131 may comprise any type of material. The description of them as being "porous" includes a resilient porous material through which gas can be drawn. It also includes a perforated sheet of resilient material such as rubber or a suitable flexible synthetic material. Also, the porous flexible jaw elements could be a flexible matting material having upstanding projections for supporting the pouch, and the strip of material lying in a frame or chamber sealing off the edges such that a pouch gripping suction or low pressure can be created around the projections when they are engaged against the face of a pouch. Any other resilient material which can be provided with passageways, bores and the like, for transmitting vacuum to the face of the elements for gripping the pouch side walls, might be used.

The ends of the curved elements are resiliently secured to the apparatus by means of a yieldable spring means 136 through 139, as shown in FIG. 14.

Each of the manifolds, carrying the respective vacuum jaws, are mounted on a reciprocating conduit 140 and 141, reciprocating in seals 142 and 143 in the walls of the chamber 42.

The conduits 140 and 141 are reciprocated by means best seen in FIGS. 13 and 16. In FIG. 13 it will be appreciated that the conduit 141 is supplied with a collar 146, while the conduit 140 is supplied with a collar 147. Each of the collars are attached to the conduits for reciprocating the conduits by means of a cylinder and lever apparatus, as shown in FIG. 13.

Specifically, levers 148 and 149 have ends attached to the respective collars, and distal ends mounted on the ends of pistons 150 and 151 of pneumatic or hydraulic cylinders 152 and 153. The levers 148 and 149 are also mounted intermediate their ends on the pistons 154 and 155 of the cylinders 156 and 157, respectively.

In order to drive the vacuum jaws forwardly toward each other, the cylinders 153 and 152 are operated by any suitable control means (not shown) to extend their pistons while cylinders 156 and 157 are operated to withdraw their cylinders. This pivots the respective levers 148, 149 in a direction as will be appreciated to move the collars inwardly toward the filling and sealing chamber 42, thereby bringing the jaws 130, 131 toward each other. As the cylinders are so actuated, the jaws engage the pouch 10 as shown in FIG. 15, and are flattened out to engage the full length of the pouch mouth.

It will be further appreciated that each of the resilient porous jaw elements 130 and 131 is provided at each end with pivoted pouch engaging slider feet 160 through 163. As the elements 130 and 131 are urged together, respective sets of opposed slider feet 160 and 163, and opposed feet 161 and 162, operate to engage the pouch 10 prior to the remainder of the porous elements 130 and 131. (In this regard, it will be appreciated in FIG. 14 that the pouch gripping jaws 91 and 92 are disposed at a level above the vertical disposition of the porous jaws 130, 131.)

As the opposing sets of slider feet engage the pouch 10, and as the resilient elements 130 and 131 finally straighten to fully engage the pouch, it will be appreciated that the opposed feet 160 and 163 move away from the feet 161 and 162 in a longitudinal direction, and in the same plane as the pouch. This opposite motion tends to stretch the pouch 10 at its upper end where engaged by the slider feet. Thus, as shown in FIG. 15, the pouch 10 is secured between the jaw elements 130 and 131 in a stretched position.

To enhance this pouch stretching operation, each of the slider feet are provided with curved engagement surfaces (FIG. 14) which initially are substantially parallel to the pouch. This avoids a line contact and provides a smoother initial engagement.

The slider feet 160 through 163 are pivotally mounted to respective shafts of the resilient spring means 136–139, thereby yieldably supporting ends of the vacuum jaws 130, 131 (FIG. 14). As the feet engage the pouch, and the elongated jaw elements are straightened, the slider feet pivot with respect to the spring shafts. This motion results in an outwardly directed pivoting movement of one opposed set of feet with respect to the other, and results in a stretching of the pouch between the feet. In other words, the opposing feet define pouch engaging nips and the nip on one end moves away from the nip on the other end to stretch the pouch. The feet surfaces are preferably proportioned and constructed to reduce the required frictional engagement on the pouch.

The slider feet thus slide across the pouch material, and pivot outwardly as well while both actions tend to stretch the pouch. It is believed the sliding motion of the feet on the pouch is the most significant motion in stretching the pouch, and alone could produce a desired stretching force. Nevertheless, the pivoting motion also produces a desirable stretching component.

FILLING AND SEALING APPARATUS—CUTTER AND SEALER

Turning now to the cutting appartus, it will be appreciated that the cutter means 48 is associated with sealing means 49. Sealing means 49 preferably comprises aluminum back-up bars 168, 169 and impulse sealing bands 170a, 170 stretched over the opposed faces of the respective bars (FIG. 19). The sealing bands, and the mounting apparatus therefore, are the same on each back-up bar. For example, each band is stretched across the face of its back-up or support bar between copper shoes 164, 164a and 165, 165a, which are mounted at the respective ends of the bars 168, 169. The bands are carried by the shoes which themselves are mounted within electrically non-conductive brackets 166 and 167 of each shoe. These brackets are secured to the bars 168, 169 and may be spring loaded as shown to maintain tension on the bands.

A "Teflon" tape T, or any other suitable insulating tape or substance, is placed on the face of the bars 168, 169 to maintain electrical isolation between the bands 170a, 170 and the bars 168, 169.

The shoes 164 and 165 are connected by any suitable means to an electronic means (not shown) for generating an electrical impulse to the sealing bands 170, 170a for sealing the pouch material engaged by the sealing means 49 at a selected time after the pouch is filled. This apparatus produces a destruct level seal in the pouch, i.e., a seal which cannot be opened without destruction of itself or the pouch material.

Alternately, any suitable sealing means may be used.

In addition, further similar sealing elements (not shown) can be depended from bars 168 to produce seals across seal gaps 20a (FIG. 3) as desired.

The cutter means 48 is comprised of an elongated straight cutter blade 171 and a tapered cutter blade 172, mounted on the respective support bars 168 and 169. As these blades are moved together, the shearing action provided therebetween cuts off the top seal 16 of the pouch 10 by cutting through the unsealed area 22.

The sealer and cutter apparatus is mounted for reciprocation in the following manner. Elongated slides, or ways, 176 and 177 are mounted between the walls 52 and 53 of the chamber 42. A slidable collar 180 is mounted on the way 176 and a slidable collar 181 on the way 177. Likewise, slidable collars 182 and 183 are mounted on the opposite ends of the ways, on the opposite side of the chamber 42. The support bar 168 and the straight cutter blade 171 are secured to the collars 180 and 181, while the tapered cutter blade 172 and the support bar 169 are secured to extensions of the collars 182 and 183. In this way, an associated set of bars, blades and collars can be reciprocated toward and away from the opposed set of bars, blades and collars in order to cut the pouch 10 and to seal it.

The drive for the cutting and sealing apparatus is depicted in FIGS. 13 and 16. The drive includes respective drive bars 184 and 185 extending through seals 186 and 187 in the walls 53 and 52 of the chamber. Drive levers 188 and 189 have respective ends 190 and 191 secured by means of pins to the respective drive bars. Opposite ends 192 and 193 are secured to respective pistons 194 and 195 of pneumatic or hydraulic cylinders 196 and 197. Intermediate portions of each of the respective bars are secured to an adjustable screw support, such as that shown at 198 and 199 in FIG. 13. When the cylinders 196 and 197 are actuated, by any suitable control means (not shown), to extend their respective pistons, the levers 188 and 189 are rotated about the screw supports so that the ends 190 and 191 of the levers move inwardly. This motion drives the drive bars 184 and 185 inwardly, and thus drives the cutter blades and sealer bars toward each other and against the pouch.

In a preferred embodiment, the cylinders and their associated drive elements are adjusted and controlled such that the straight cutter bar 171 is first moved against the pouch to center it properly, and thereafter the cutter 172 and the associated drive mechanism is actuated to move the cutter 172 against the pouch to shear off the temporary top seal 16. Finally, it will be noted that cool water conduits 200 may be provided through the support bars 168, 169 for the purpose of cooling the sealing apparatus.

FILLING AND SEALING APPARATUS—HANDLING CUT-OFF SEAL

As depicted in FIG. 14, it will be appreciated that it is desired to bring a fill tube down into the pouch for filling purposes. Nevertheless, it will also be appreciated that when the cutters are moved so as to cut off the upper seal 16, the upper seal 16 is maintained in its centralized position by means of the gripping jaws 91 and 92, as heretofore described. Accordingly, that positioning of the upper temporary, and now cut off, seal 16 and bag segment 22a would interfere with the introduction of the fill tube into the pouch.

In order to move this cut off portion of the pouch away from the path of the fill tube, a lever means 210 is provided. Lever means 210 comprises a bell crank having a operating handle 211 extending outwardly of an upper wall 212 of the chamber 42, as shown in FIG. 16. The bell crank includes a distal end 213 extending downwardly to a vertical depth, such as to be in a position to engage the cut off seal 16 when the crank is rotated.

FIG. 16 depicts the pouch 10 and the upper temporary seal portion thereof maintained in an initial position within the chamber 42. FIG. 17 depicts the operation of the handle 211 to a position wherein the distal end 213 of the bell crank has moved the upper, now cut off, seal portion 16 out of the way of a descending fill tube. In this condition it will be appreciated that the gripper jaw 92 (see FIGS. 14, 15 and 16) and the gripper jaw 91 at the other end of the pouch 10 still maintain the ends of the cut off seal portion. Nevertheless, the distal end 213 of the bell crank has moved a distance sufficient to move the cut off seal portion 16 away from the fill tube's path.

FILLING AND SEALING APPARATUS—FILLING MEANS

The filling means of the apparatus is best seen in FIGS. 16 and 17.

It will be appreciated that it is desirable to maintain the areas of the pouch to be sealed completely free of product. Any product in the seal area would prevent complete, thorough seals and could cause them to be weak or ineffective to provide a barrier seal against contamination.

In this regard, the invention contemplates use of an extendable filling tube which is introduced into the pouch, below the areas to be sealed, for product filling. After filling, the tube is withdrawn before the pouch is closed and sealed. This leaves the upper areas of the pouch free of any product, and helps assure complete and thorough seals.

The filling means comprises a fill tube 220 extending through a seal 221 in an upper wall 212 of the chamber 42. The fill tube is operably connected to a product conduit 222, such that when product is forced through the conduit 222 into the fill tube, the product may be delivered to a pouch 10.

The fill tube may be reciprocated by a pneumatic or hydraulic cylinder means 225, operated by any suitable control means (not shown). In particular, a cylinder 225 has a piston 226 mounted to a bracket 227 on the upper wall 212 of the chamber 42. The cylinder itself is pivoted to a lever arm 228 which has one end connected to a lever 229, also pivoted to the bracket 227, and the other end connected to the reciprocating fill tube 220 by means of a pivot pin 230. Actuation of the cylinder to extend the piston 226 causes the cylinder, and thus the fill tube, to raise with respect to the chamber 42. Actuation of the cylinder to withdraw the piston 226 into the cylinder causes a lowering of the fill tube 220 into its filling position, below the mouth of the pouch, as shown in FIG. 17.

The fill tube is provided with a valve 235 mounted on a valve stem 236 extending through the fill tube 220 and above the product conduit 222 for actuation with respect to the fill tube. Any suitable means such as means 234 may be utilized to reciprocate the valve stem 236 to move the valve 235 away from the seat 237, and thus permit product to flow through the fill tube 220 and into the pouch, as shown in FIG. 17. Selectively, the valve stem 236 is raised with respect to the fill tube 220 to close the valve, as shown in FIG. 16. The operation of the valve 235 and stem 236 is independent of the reciprocable movement of the fill tube, so that the opening and closing of the valve may be controlled as desired.

FILLING AND SEALING PROCESS

The operation of the apparatus described herein is preferably as follows. First, of course, the internal areas of the apparatus including the chamber 42 are presterilized by means of any suitable steaming or washing procedure. Thereafter, a pouch 10 is loaded into the pouch carrier 46 at the first loading/discharge position, and the swing arm means 44 is actuated to dip the pouch through the sterilant bath. The pouch is retained in the sterilant bath for a sufficient duration for sterilization, and is thereafter raised into the chamber 42 where the pouch is in the second or fill position. Motion of the swing arm means 44 away from the pouch loading position permits the gripper means 91 and 92 to engage the temporary seal 16 of the pouch at the ends thereof.

Once the pouch carrier 46 is raised to the pouch fill position in chamber 42, the vacuum jaws are run together to engage and stretch the pouch 10 beneath the temporary seal 16. The vacuum is then actuated so that the jaws 130, 131 effectively grip the side walls 11, 12 of the pouch in the area near the half seals 20 and 21.

The static cutter bar 171 is then moved into position adjacent the pouch to center the pouch and provide a static shear. The dynamic, or tapered, cutter bar 172 is then moved to its center position, slicing off the top temporary seal 16 of the pouch, which severed section continues to be held by the gripping means 91 and 92.

At this point, the handle 211 may be turned to move the distal end of the bell crank against the now removed temporary seal portion 16 to move it slightly off center to permit the fill tube 220 to be inserted into the pouch 10.

The cutting bars 171, 172 are moved apart and the vacuum jaws 130, 131 are pulled apart, thus opening the pouch 10. It will be appreciated that the half seals 20, 21 in each of the multiple plies of the respective side walls insure that the vacuum jaws, even though engaged against only the outermost respective plies, will fully open the pouch to present a center pouch envelope, defined between the full pouch side walls, for product receipt. The fill tube cannot be inadvertently inserted into an area between plies of any particular side wall, since the half seals carry with them the respective plies of the respective side walls.

At this point, the cylinder 225 is operated to lower the fill tube 220 into the opened mouth of the pouch. Thereafter, the valve stem 236 is operated to open the valve 235 and permit the product "P" (FIG. 17) to flow into the pouch. After the appropriate volume of product has been dispensed, the valve 235 is closed and the full tube or head is raised.

The vacuum jaws 130, 131 are then operated toward each other. Engagement of the upper portion of the pouch 10 is an area proximate the half seals 20, 21 by the opposed feet 161 and 162 at one end of the pouch and 160 and 163 at the other end of the pouch, tend to continue to stretch the pouch mouth. Engagement of the stretched pouch mouth by the jaw elements 130 and 131 flatten the mouth of the pouch to provide flat side walls for the provision of a consistent seal in the areas adjacent the half seals 20 and 21, and either above or below them. The support bars 168, 169 with impulse seal bands 170, 170a are closed to engage the desired upper final seal area of the pouch, and an electrical impulse is provided to the bands to heat seal all the respective plies of the pouch together.

Thereafter, the vacuum is cut off, the seal bars and the vacuum jaws are reciprocated apart as described above, and the swing arm 44 is actuated to rotate the pouch carrier 46 downwardly through the sterilant bath and to the first loading or discharge position. At this position, the temporary seal 16 is removed from the gripping jaws 91 and 92, and the filled and sealed pouch 10 is removed from the apparatus.

FILLING AND SEALING APPARATUS—POUCH FILLING AND CARRIER SUPPORT

Figure 18A:
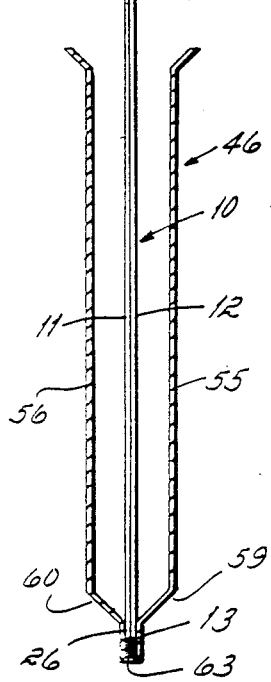
FIGS. 18A–18C are sequential views of the pouch carrier and the pouch showing the progressive shape of the pouch within the carrier as the pouch is filled.
Figure 18B:
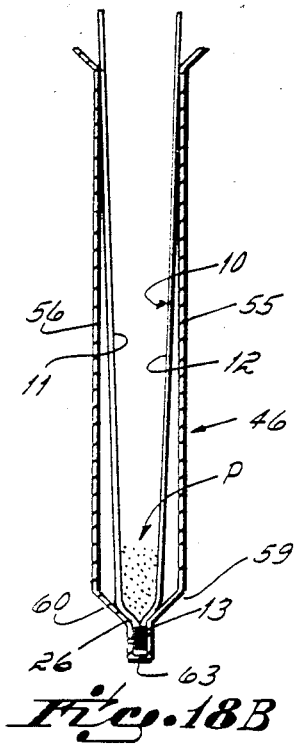
Figure 18C:
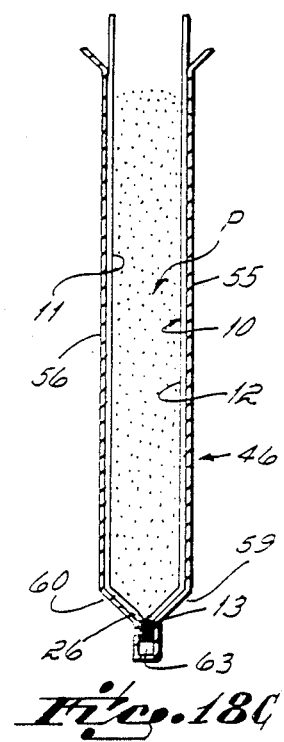

Turning now to FIG. 18, the operation of the pouch carrier 46 to support the pouch during handling and filling is depicted. In particular, it will be appreciated that when the pouch is first inserted into the carrier, marginal portions including the perimeter seals 13, 14 and 15, are disposed in the bottom slot 63 and the side slots 76 and 77 of the pouch carrier. The position of the bottom marginal area 26 is depicted in FIG. 18A at the bottom of the slot 63.

As the pouch is filled with product, such as indicated by the letter "P" in FIG. 18B, the pouch side walls 11, 12 tend to bow outwardly toward the carrier side walls 55, 56, the carrier preferably draining of sterilent when lifted into the filling position. As the product fills from the bottom of the pouch upwardly, it tends to weight heavily on the bottom portions of the pouch, as depicted in FIG. 18B. As more product is filled into the pouch, the outward bowing tends to pull the lower pouch margin 26 upwardly from slot 63, and the material fills out into a shape corresponding to that of the carrier. As a result of this motion, the bottom marginal area of the pouch is raised from the bottom of the slot 23 as shown in FIG. 18B. Continued filling of the pouch results in an increased upward movement of the bottom marginal area to the point where the bottom portions of the bag lie adjacent the tapered walls 59 and 60 of the pouch walls 55 and 56, filling out the entire bottom of the pouch carrier. This similar operation also occurs with the side portions and seals of the pouch in slots 76 and 77.

It will be appreciated that the dimensions of the margin area of the pouch and of the seals 13, 14 and 15 will be selected so that the innermost portions of the seal are even with the innermost portions of the slots 63, 76 and 77 when the pouch is filled. Accordingly, when the pouch is filled, it will be appreciated that no undesired peel stress is placed on the pouch's marginal seals. The pouch 10 is fully supported by the carrier 46, the marginal seals lying in the carrier's seal supporting slots. The tapered carrier walls, both at the bottom and sides of the carrier, support the pouch walls at the seal juncture, thereby substantially reducing peel forces placed on the pouch seal by the weight of the product.

Many other aspects of the invention will be readily apparent. For example, it will be appreciated that it is necessary to sterilize the entire filling and sealing apparatus prior to its use. In this connection, it is possible to provide covers for the filling and sealing apparatus over the discharge positions D-1 and D-2, such that the entire apparatus can be pressurized and steam sterilized, for example. In addition, appropriate sterilant valve drains, steam inlets, microbial filters, and other devices and processes may be utilized in connection with the apparatus to clean and sterilize the entire apparatus and filling mechanism to insure aseptic conditions within the chamber 42 and within the filled pouches before a filling operation is started.

Moreover, it will also be appreciated that it is possible to utilize a steam injection means in the aseptic filling chamber, such that steam can be supplied to the filling chamber during pouch filling so as to purge the nitrogen or other inert gas within the chamber from the pouch before the pouch is finally sealed.

Accordingly, the present invention has provided filling and sealing apparatus and processes useful for receiving a flexible, pre-sterilized, temporarily sealed, aseptic pouch, transmitting it to an aseptic chamber, opening, filling and sealing the pouch, and thereafter discharging the pouch, all under aseptic conditions and without manual manipulation of the pouch. The invention includes improved pouch handling, opening, closing and sealing apparatus.

These and other advantages and modifications will become readily apparent to those of ordinary skill in the art without departing from the scope of this invention, and applicants intend to be bound only by the claims appended hereto.

I claim:

1. In combination, filling means, and apparatus for engaging, opening and closing a flexible walled pouch to be filled by said filling means, wherein said apparatus comprises:

two opposed vacuum jaw means including normally curved resilient porous members disposed opposite and spaced from one another and having respective adjacent ends;

a stretching foot means disposed proximate each end of each said resilient member, each said foot means being disposed adjacent and spaced from the foot means of said opposed resilient member such that said respective opposed foot means at each end of the resilient members are closer to each other than are central portions of said normally curved resilient members;

said respective opposed foot means being normally spaced apart for receiving a pouch therebetween;

both said vacuum jaw means being mounted for motion toward and away from each other for engaging and stretching a pouch; and said foot means, upon converging motion of said opposed jaw means, for engaging a pouch before said resilient members engage said pouch, said opposed foot means at adjacent ends of said resilient members being operable to move away from opposed foot means at other adjacent ends of said resilient members to stretch said pouch therebetween.

2. Apparatus as in claim 1 wherein said foot means are operable to engage and pinch said pouch, stretch said pouch, and slide on said pouch in opposed directions as said resilient members flatten upon motion toward each other during engagement with said pouch.

3. Apparatus as in claim 2 including means for applying a vacuum to said resilient porous members.

4. Apparatus as in claim 3 wherein during application of said vacuum adjacent said pouch mouth said resilient members are operable to return to curved disposition upon motion away from each other to thereby open said pouch mouth.

5. Apparatus as in claim 1 wherein said foot means each have initial pouch engaging surfaces thereon substantially parallel to said pouch upon initial engagement therewith, said initial pouch engaging surfaces tapering away from said pouch when said resilient members lie flat against said pouch.

6. Apparatus for engaging, stretching, opening and closing a flexible pouch having opposed side walls, for filling said pouch, said apparatus comprising:

two opposed vacuum jaws;

each jaw comprising a resilient normally curved porous element;

each jaw element having two initial pouch engaging ends spaced from and opposite initial pouch engaging ends of the opposed jaw element such that said opposed ends are disposed closer to each other than are the central respective portions of said jaw elements; and means operable to move said elements and pouch engaging ends toward each other to engage a pouch, with said initial ends engaging said pouch, moving apart, and stretching said pouch side walls into a flattened condition as said curved resilient jaw elements straighten into engagement with said pouch side walls.

7. Apparatus as in claim 6 wherein each said jaw element has a portion mounted on a vacuum plenum means, and further including respective resilient means for securing said initial pouch engaging ends of said jaw elements to said plenum means for movement with respect to said plenum mounted portion.

8. Apparatus as in claim 7 wherein said initial pouch engaging ends comprise feet means mounted on said resilient means for pivotal motion relative thereto and operable to stretch said pouch as said jaw elements are moved inwardly toward said pouch.

9. Apparatus as in claim 8 wherein said jaw elements are elongated from end to end and include passageways for transmission of vacuum therethrough.

10. Apparatus as in claim 6 including means for applying a vacuum to said porous jaw elements and means for withdrawing said jaw elements away from each other, each said jaw element being operable to engage a respective pouch side wall and draw it away from an opposed side wall as said initial pouch engaging ends thereof move inwardly toward one another to relieve stretching bias on the associated said side wall.

11. Apparatus as in claim 6 wherein said initial pouch engaging ends comprise pouch engaging feet pivoted to said jaw elements at ends thereof.

12. Apparatus as in claim 11 wherein said feet on each end of a jaw element are disposed opposite feet on the other jaw and pouch engaging nips are formed between opposing feet.

13. Apparatus as in claim 12 wherein each of said feet pivots outwardly from said jaw elements when engaging a pouch, said respective nips moving in an outward direction and apart from each other to stretch said pouch.

14. Apparatus as in claim 13 wherein said feet slide on said pouch side walls in an outward direction thereby stretching said pouch side walls.

15. Apparatus as in claim 7 wherein said resilient means comprise respective springs mounted between ends of said jaw elements and said plenum mounted portion, said springs collapsing upon engagement of said pouch engaging ends with a pouch and constantly urging said pouch engaging ends in a direction toward an opposed jaw element such that said elements are normally curved upon initial engagement with a pouch.

* * * * *

UNITED STATES PATENT AND TRADEMARK OFFICE
CERTIFICATE OF CORRECTION

PATENT NO. : 4,583,352
DATED : April 22, 1986
INVENTOR(S) : J. Richard Heron

It is certified that error appears in the above-identified patent and that said Letters Patent is hereby corrected as shown below:

Column 14, line 31, "reduce" should be --produce--

Signed and Sealed this

Twenty-third Day of September 1986

[SEAL]

Attest:

DONALD J. QUIGG

Attesting Officer

Commissioner of Patents and Trademarks